United States Patent
Harada

(10) Patent No.: US 8,870,389 B2
(45) Date of Patent: Oct. 28, 2014

(54) IMAGE PROJECTION SYSTEM AND IMAGE GEOMETRIC CORRECTION DEVICE

(75) Inventor: Masayuki Harada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1652 days.

(21) Appl. No.: 11/632,927

(22) PCT Filed: Sep. 15, 2004

(86) PCT No.: PCT/JP2004/013450
§ 371 (c)(1),
(2), (4) Date: May 6, 2008

(87) PCT Pub. No.: WO2006/030501
PCT Pub. Date: Mar. 23, 2006

(65) Prior Publication Data
US 2009/0002637 A1    Jan. 1, 2009

(51) Int. Cl.
*G03B 21/26* (2006.01)
*H04N 9/31* (2006.01)

(52) U.S. Cl.
CPC ........... *H04N 9/3197* (2013.01); *H04N 9/3185* (2013.01); *H04N 9/3147* (2013.01); *H04N 9/3194* (2013.01)
USPC .............................................. 353/94; 348/95

(58) Field of Classification Search
USPC ............................................... 353/94; 348/59
See application file for complete search history.

(56) References Cited

U.S. PATENT DOCUMENTS

| | | | |
|---|---|---|---|
| 6,219,099 B1 * | 4/2001 | Johnson et al. | 348/383 |
| 6,310,650 B1 | 10/2001 | Johnson et al. | |
| 2002/0015052 A1 * | 2/2002 | Deering | 345/647 |
| 2004/0239885 A1 * | 12/2004 | Jaynes et al. | 353/30 |

FOREIGN PATENT DOCUMENTS

| | | |
|---|---|---|
| EP | 1 385 335 | 1/2004 |
| EP | 1 116 385 B1 | 2/2004 |
| JP | 2000-350230 A | 12/2000 |
| JP | 2001-251651 A | 9/2001 |
| JP | 2002-525694 A | 8/2002 |
| JP | 2003-524915 A | 8/2003 |

OTHER PUBLICATIONS

"Optics & Optoelectronic Technology," vol. 2, No. 3, Jun. 2004.

* cited by examiner

*Primary Examiner* — Francis M Legasse, Jr.
*Assistant Examiner* — Jerry Brooks
(74) *Attorney, Agent, or Firm* — Birch, Stewart, Kolasch & Birch, LLP

(57) ABSTRACT

An image geometric correction device 6 unifies the coordinate systems of images captured by image capturing devices 4-1 and 4-2 into a coordinate system, and makes a geometric correction to the images projected by image projection devices 1-1, 1-2, and 1-3 on the basis of an image projection region E in the coordinate system into which the coordinate systems of the captured images are unified. As a result, the image geometric correction device can make a geometric correction to the projected images without strictly placing the image capturing devices 4-1 and 4-2 at predetermined positions.

8 Claims, 8 Drawing Sheets

|  | Image Projection Device 4-1 | Image Projection Device 4-2 |
|---|---|---|
| Image Projection Device 1-1 | Image (11) |  |
|  | Conversion (11) |  |
| Image Projection Device 1-2 | Image (21) | Image (22) |
|  | Conversion (21) | Conversion (22) |
| Image Projection Device 1-2 |  | Image (32) |
|  |  | Conversion (32) |

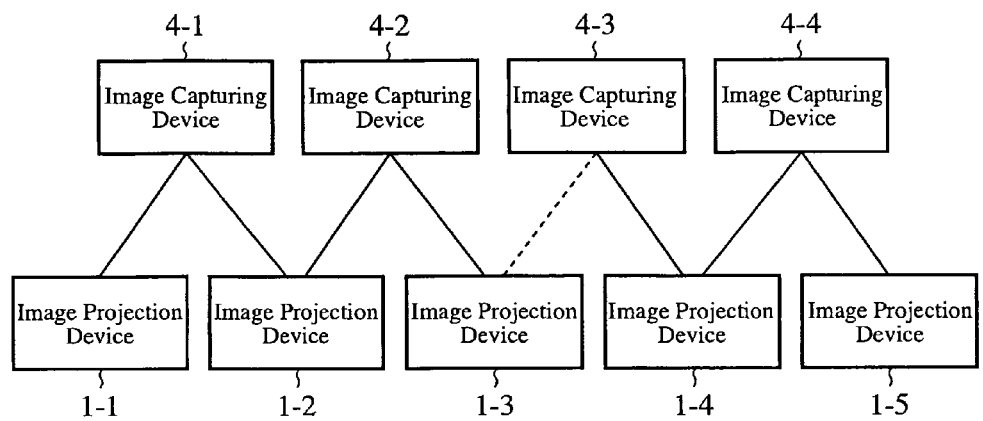

|  | Image Capturing Device 4-1 | Image Capturing Device 4-2 | Image Capturing Device 4-3 | Image Capturing Device 4-4 |
|---|---|---|---|---|
| Image Projection Device 1-1 | Image (11) | | | |
| | Conversion (11) | | | |
| Image Projection Device 1-2 | Image (21) | Image (22) | | |
| | Conversion (21) | Conversion (22) | | |
| Image Projection Device 1-3 | | Image (32) | Image (33) | |
| | | Conversion (32) | Conversion (33) | |
| Image Projection Device 1-4 | | | Image (43) | Image (44) |
| | | | Conversion (43) | Conversion (44) |
| Image Projection Device 1-5 | | | | Image (54) |
| | | | | Conversion (54) |

|  | Image Projection Device 4-1 | Image Projection Device 4-2 |
|---|---|---|
| Image Projection Device 1-1 | Image (11) | |
| | Conversion (11) | |
| Image Projection Device 1-2 | Image (21) | Image (22) |
| | Conversion (21) | Conversion (22) |
| Image Projection Device 1-3 | | Image (32) |
| | | Conversion (32) |
| Image Projection Device 1-4 | | Image (42) |
| | | Conversion (42) |

IMAGE PROJECTION SYSTEM AND IMAGE GEOMETRIC CORRECTION DEVICE

FIELD OF THE INVENTION

The present invention relates to an image projection system which connects part images projected by two or more image projection devices to one another on one screen so as to display a single image, and an image geometric correction device which makes a geometric correction to each of the part images so that the part images projected by the two or more image projection devices can be smoothly connected to one another at their connection regions.

BACKGROUND OF THE INVENTION

An image projection system which connects images projected by two or more image projection devices on one screen to one another to generate a single image, and displays the single image needs to move the positions of the projected images and to deform the projected images so that the projected images can be smoothly connected to one another at their connection points. Generally, this movement processing and deformation processing are called a geometric correction.

Because it is necessary to grasp the positions on the screen of the images projected by the two or more image projection devices, and overlapping of the two or more projected images, etc. in order to carry out this geometric correction, an image capturing device for capturing the images projected by the two or more image projection devices is disposed.

On the other hand, there is provided a prior art image geometric correction device which needs to capture, as a single image, two or more images projected onto a whole screen without distortion in order to capture the two or more projected images in a state in which they actually overlap one another to determine overlapping of the two or more projected images, and in order to calculate the amount of image geometric correction correctly.

For this purpose, it is necessary to place an image capturing device at a position which it can capture the whole screen with one time capturing so that it is just opposite to the screen (for example, refer to patent reference 1).

[Patent reference 1] JP, 2000-350230, A

A problem with the prior art image projection system constructed as mentioned above is that it is necessary to strictly place an image capturing device at a predetermined position in order to capture, as a single image, images projected onto a whole screen in a state in which all image projection devices project the images on the screen.

The present invention is made in order to solve the above-mentioned problem, and it is therefore an object of the present invention to provide an image projection system and an image geometric correction device which can divide an image which consists of projected images on a whole screen into two or more images and capture them, and which can make a geometric correction to the projected images without strictly placing image capturing devices at predetermined positions.

DISCLOSURE OF THE INVENTION

In accordance with the present invention, an image geometric correction device unifies the coordinate systems of images captured by image capturing devices into a coordinate system, and makes a geometric correction to the images projected by image projection devices on the basis of an image projection region in the coordinate system into which the coordinate systems of the captured images are unified.

Therefore, the present invention offers an advantage of being able to divide an image on the whole screen into two or more part images and then capture them, and to make a geometric correction to the projected images, without strictly placing the image capturing devices at predetermined positions.

BRIEF DESCRIPTION OF THE FIGURES

FIG. 7 is a block diagram showing each image projection device and an image geometric correction device in an image projection system in accordance with embodiment 2 of the present invention;

FIG. 8 is an explanatory diagram showing images and deformation movement conversion data stored in a storage unit;

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
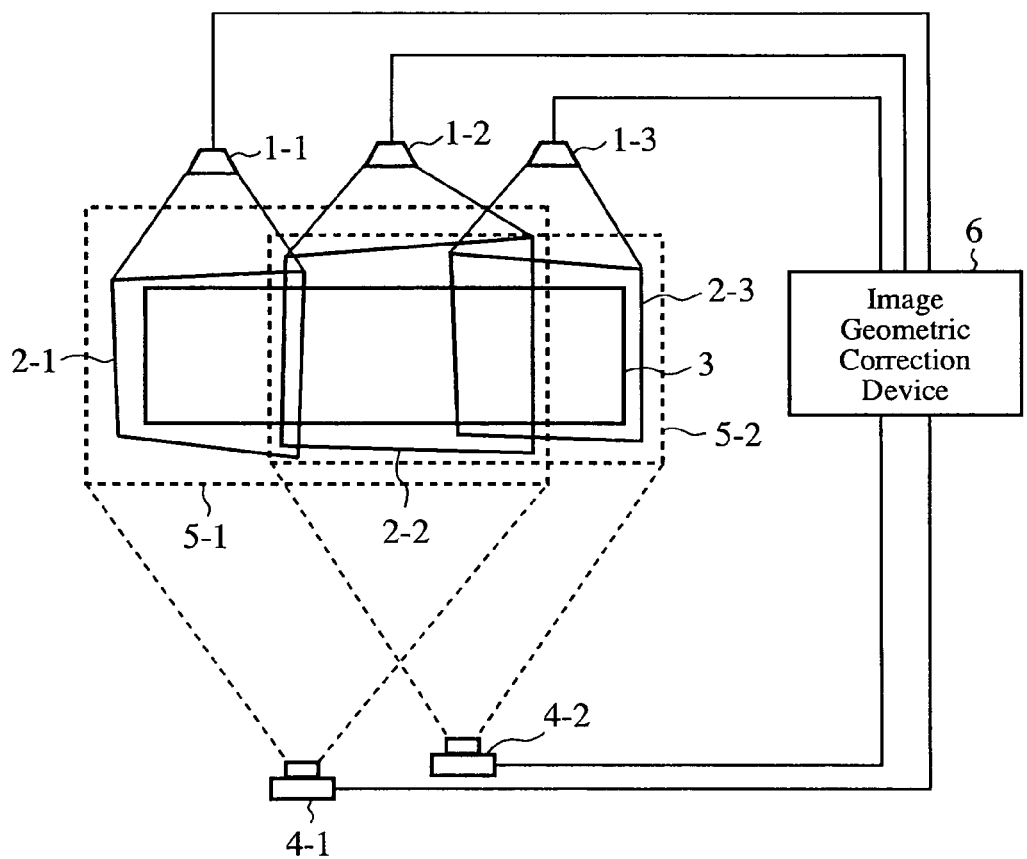
FIG. 1 is a block diagram showing an image projection system in accordance with embodiment 1 of the present invention.

FIG. 1 is a block diagram showing an image projection system in accordance with embodiment 1 of the present invention. In the figure, an image projection device 1-1 projects an image 2-1 which is a part image on a left-hand section of a screen 3, and an image projection device 1-2 projects an image 2-2 which is a part image on a central section of the screen 3. Furthermore, an image projection device 1-3 projects an image 2-3 which is a part image on a right-hand section of the screen 3.

An image capturing device 4-1 captures an image region to be captured 5-1 which includes the images 2-1 and 2-2 respectively projected by the image projection devices 1-1 and 1-2, and an image capturing device 4-2 captures an image region to be captured 5-2 which includes the images 2-2 and 2-3 respectively projected by the image projection devices 1-2 and 1-3.

An image geometric correction device 6 unifies the coordinate systems of the images captured by the image capturing devices 4-1 and 4-2 into a coordinate system, and carries out a geometric correction of the images projected by the image projection devices 1-1, 1-2, and 1-3 on the basis of an image projection region in the coordinate system into which the coordinate systems of the captured images are unified.

Figure 2:
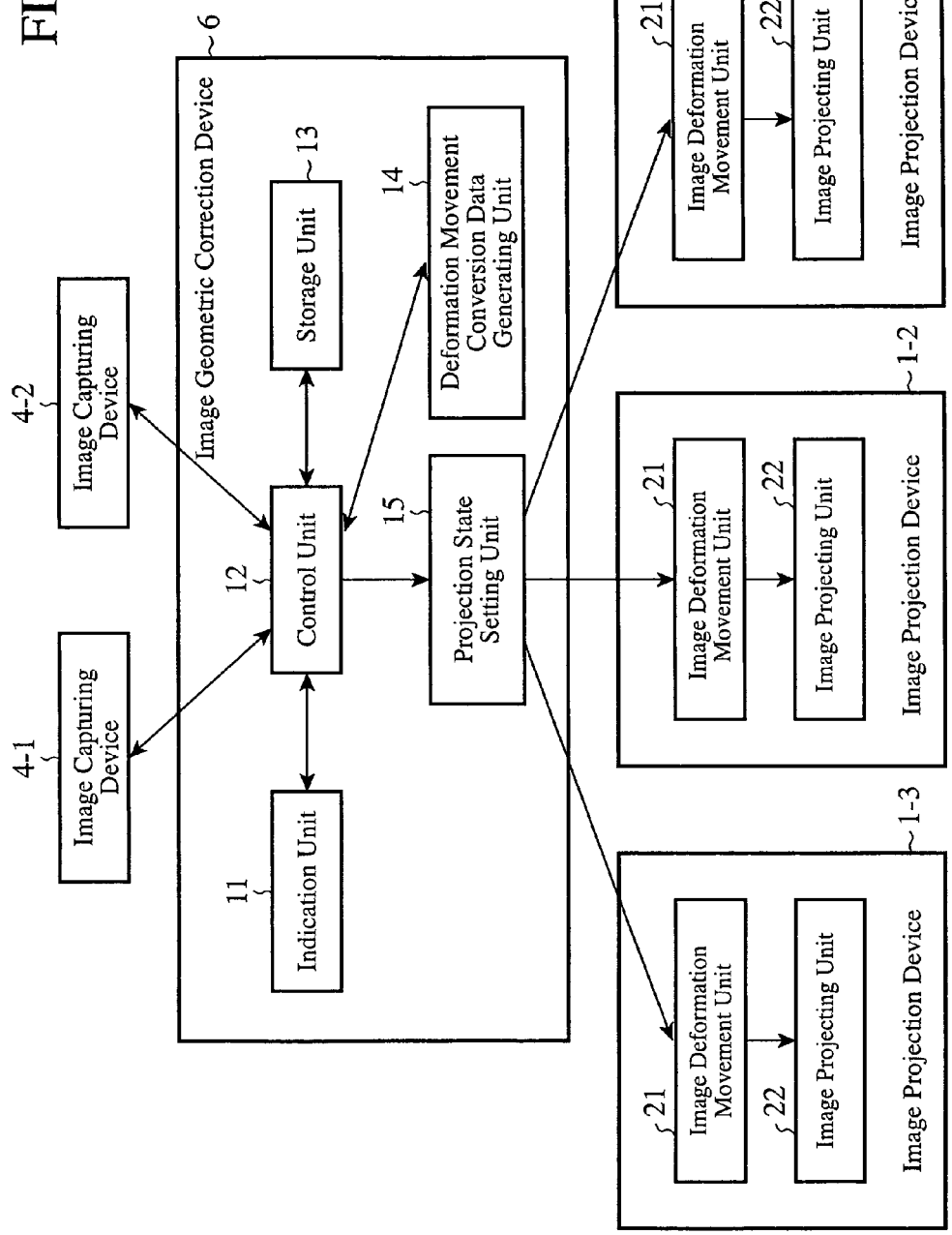
FIG. 2 is a block diagram showing the internal structure of each image projection device and the internal structure of an image geometric correction device.

FIG. 2 is a block diagram showing the internal structure of each image projection device and the internal structure of the image geometric correction device. In the figure, an indication unit 11 of the image geometric correction device 6 is provided with a man machine interface, such as a keyboard, and sets up a correspondence between the image projection devices and the image capturing devices while specifying positions in the screen 3 on which the images are respectively projected by the image projection devices 1-1, 1-2, and 1-3.

A control unit 12 of the image geometric correction device 6 controls the whole of processing done by the image projection system, and also unifies the coordinate systems of the images respectively captured by the image capturing devices 4-1 and 4-2 using deformation and movement conversion data generated by a deformation movement conversion data generating unit 14 while performing a process of setting up the image projection region in the coordinate system into which the coordinate systems of the captured images are unified.

A storage unit 13 of the image geometric correction device 6 holds the images respectively captured by the image capturing devices 4-1 and 4-2, deformation and movement conversion data generated by the deformation movement conversion data generating unit 14, etc.

The deformation movement conversion data generating unit 14 of the image geometric correction device 6 generates the deformation movement conversion data defining deformation and movement between the images projected by the image projection devices 1 and those captured by the image capturing devices 4 from the images captured by the image capturing devices 4-1 and 4-2.

The control unit 12 and deformation movement conversion data generating unit 14 construct a coordinate system unifying means, and the control unit 12 constructs a projection region setting means.

A projection state setting unit 15 of the image geometric correction device 6 controls an image deformation movement unit 21 of each of the image projection devices 1-1, 1-2, and 1-3 so that the projection regions of the images captured by each of the image capturing devices 4-1 and 4-2 match with image projection regions set up by the control unit 12, respectively. The projection state setting unit 15 constructs a geometric correction means.

The image deformation movement unit 21 of each of the image projection devices 1-1, 1-2, and 1-3 carries out processes of deforming and moving the image projected by a corresponding image projecting unit 22 according to an instruction from the projection state setting unit 15.

The image projecting units 22 of the image projection devices 1-1, 1-2, and 1-3 projects the images 2-1, 2-2, and 2-3 which have been processed by the image deformation movement units 21 onto the screen 3.

Next, the operation of the image projection system in accordance with this embodiment of the present invention will be explained.

The indication unit 11 of the image geometric correction device 6 sets up a correspondence between the image projection devices 1 and the image capturing devices 4.

In the example of FIG. 1, the indication unit sets up a correspondence between the image projection devices and the image capturing devices so that the image capturing device 4-1 captures the image projected by the image projection device 1-1, the image capturing devices 4-1 and 4-2 capture the image projected by the image projection device 1-2, and the image capturing device 4-2 captures the image projected by the image projection device 1-3. Therefore, in this case, the indication unit defines four combinations between the image projection devices 1 and the image capturing devices 4.

The combinations between the image projection devices 1 and the image capturing devices 4 can be determined in advance. As an alternative, the user can specify combinations between the image projection devices 1 and the image capturing devices 4 by operating the indication unit 11.

After setting up a correspondence between the image projection devices 1 and the image capturing devices 4, as mentioned above, the indication unit 11 of the image geometric correction device 6 specifies the positions on the screen 3 of the images respectively projected by the image projection devices 1-1, 1-2, and 1-3. In this case, the indication unit specifies the positions on the screen 3 of the images respectively projected by the image projection devices 1-1, 1-2, and 1-3 so that the projection region of the image 2-1 projected by the image projection device 1-1 partially overlaps the projection region of the image 2-2 projected by the image projection device 1-2, and the projection region of the image 2-2 projected by the image projection device 1-2 partially overlaps the projection region of the image 2-3 projected by the image projection device 1-3.

When receiving the positions on the screen 3 of the images respectively projected by the image projection devices 1-1, 1-2, and 1-3 from the indication unit 11 via the control unit 12, the projection state setting unit 15 of the image geometric correction device 6 controls the image projection devices 1-1, 1-2, and 1-3 so that the positions of the image respectively projected by the image projection device 1-1, 1-2, and 1-3 match with the positions specified by the indication unit 11, respectively.

In this stage, the projection state setting unit 15 controls the image projection devices 1-1, 1-2, and 1-3 so that while the image deformation movement unit 21 of each of the image projection devices 1-1, 1-2, and 1-3 does not carry out image deformation processing and image movement processing, their image projection units 22 simply project the images 2-1, 2-2, and 2-3 on the screen 3.

As a result, the image projecting units 22 of the image projection devices 1-1, 1-2, and 1-3 project the images 2-1, 2-2, and 2-3 on the screen 3 under control of the image geometric correction device 6, as shown in FIG. 1.

At that time, because the accuracy of image processing done by each of the image capturing devices 4-1 and 4-2 degrades when the image projecting units 22 of the image projection devices 1-1, 1-2, and 1-3 project the images 2-1, 2-2, and 2-3 on the screen 3 simultaneously, the control unit 12 of the image geometric correction device 6 carries out a control operation via the projection state setting unit 15 so as to carry out a total of four projections and captures of an image for the four combinations of the image projection devices 1 and the image capturing devices 4, respectively.

In other words, when the image projection device 1-1 projects the image, the image capturing device 4-1 captures the image while the image projection device 1-2 and 1-3 project no images.

When the image projection device 1-2 projects the image, the image capturing devices 4-1 and 4-2 capture the images while the image projection devices 1-1 and 1-3 project no images. When the image projection device 1-3 projects the image, the image capturing device 4-2 captures the image while the image projection devices 1-1 and 1-2 project no image.

Thus, the image projection system in accordance with this embodiment is so constructed that when a certain one of the two or more image projection devices projects the corresponding image, any other image projection device projects no image. As an alternative, if, while a certain one of the two or more image projection device projects the corresponding image, all other image projection devices can be adapted to cause no degradation in the accuracy of the image processing by each of the image capturing devices 4-1 and 4-2 by, for example, projecting an all-black image, the image projection system can make the image projection devices 1-1, 1-2, and 1-3 project the images 2-1, 2-2, and 2-3 on the screen 3 simultaneously.

In this stage, because the images 2-1, 2-2, and 2-3 projected by the image projection devices 1-1, 1-2, and 1-3 are the ones which they project, respectively, in order that the deformation movement conversion data generating unit 14 generates the deformation movement conversion data, the projection state setting unit 15 of the image geometric correction device 6 controls the image projection devices 1-1, 1-2, and 1-3 so that each of them projects an image, such as a checker pattern, for example.

When the image projection device 1-1, 1-2, and 1-3 project the images 2-1, 2-2, and 2-3, such as checker patterns, in turn and the image capturing device 4-1 and 4-2 captures the images in turn, the control unit 12 of the image geometric correction device 6 stores the images in the storage unit 13.

Figures 3, 4:
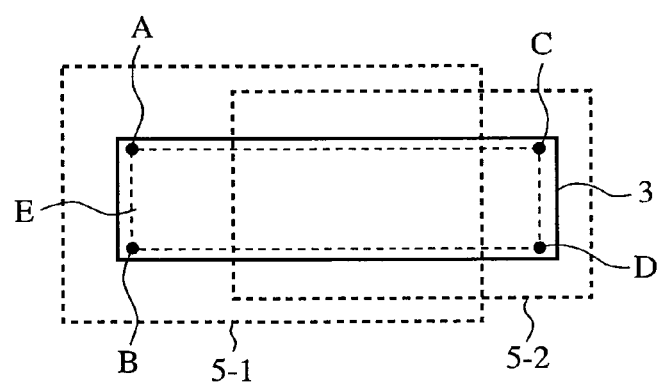
FIG. 3 is an explanatory diagram showing images and deformation movement conversion data stored in a storage unit.
FIG. 4 is an explanatory diagram showing a projection region E in a screen.

As shown in FIG. 3, the storage unit 13 stores, as an image (11), the image which the image projection device 1-1 projects and the image capturing device 4-1 captures, and stores, as an image (21), the image which the image projection device 1-2 projects and the image capturing device 4-1 captures.

The storage unit 13 also stores, as an image (22), the image which the image projection device 1-2 projects and the image capturing device 4-2 captures, and stores, as an image (32), the image which the image projection device 1-3 projects and the image capturing device 4-2 captures.

The deformation movement conversion data generating unit 14 of the image geometric correction device 6 generates deformation movement conversion data defining deformation and movement between the images projected by the image projection devices 1 and those captured by the image capturing devices 4 from the images (11), (21), (22), and (32) captured by the image capturing devices 4-1 and 4-2.

Concretely, the deformation movement conversion data generating unit generates deformation movement conversion data as follows.

For example, when generating the deformation movement conversion data defining deformation and movement between the image projected by the image projection device 1-1 and that captured by the image capturing device 4-1, the deformation movement conversion data generating unit 14 specifies certain points of the image 2-1 projected by the image projection device 1-1, and corresponding points of the image (11) captured by the image capturing device 4-1. For example, the deformation movement conversion data generating unit specifies the points of the four corners of each of the both images.

When the deformation movement conversion data generating unit 14 assumes that both the image 2-1 projected by the image projection device 1-1 and the image (11) captured by the image capturing device 4-1 exist in a plane, and specifies four or more certain points of the image 2-1 and corresponding points of the image (11), the deformation movement conversion data generating unit can define the relation between the image projected by the image projection device 1-1 and that captured by the image capturing device 4-1 with a projective transformation H (Homography). The deformation movement conversion data generating unit thus calculates a projective transformation H between the image projected by the image projection device 1-1 and that captured by the image capturing device 4-1.

The projective transformation H is expressed as a 3×3 matrix, as will be explained below, and the matrix has 8 degrees of freedom because it can be arbitrarily multiplied by a fixed number. Thus, when four or more certain points of the image projected by the image projection device 1-1 and corresponding points of the image captured by the image capturing device 4-1 can be detected, a projective transformation H between the image projected by the image projection device 1-1 and that captured by the image capturing device 4-1 can be obtained.

$$H = \begin{pmatrix} a, b, c \\ d, e, f \\ g, h, 1 \end{pmatrix} \quad \text{[Equation 1]}$$

In other words, when the coordinates of an arbitrary point in the coordinate system of the image projected by the image projection device 1-1 is expressed as (x, y) and the coordinates of an arbitrary point in the coordinate system of the image captured by the image capturing device 4-1 is expressed as (X, Y), because the following relation is established and the number of variables (a to h) is 8, the deformation movement conversion data generating unit 14 can calculate the projective transformation H by specifying four or more sets of corresponding points: $(x_1, y_1)$ & $(X_1, Y_1)$, $(x_2, y_2)$ & $(X_2, Y_2)$, $(x_3, y_3)$ & $(X_3, Y_3)$, and $(x_4, y_4)$ & $(X_4, Y_4)$ $$\begin{pmatrix} u \\ v \\ w \end{pmatrix} = \begin{pmatrix} a, b, c \\ d, e, f \\ g, h, l \end{pmatrix} \begin{pmatrix} x \\ y \\ 1 \end{pmatrix} = \begin{pmatrix} ax + by + c \\ dx + ey + f \\ gx + hy + 1 \end{pmatrix} \quad \text{[Equation 2]}$$

$$X = \frac{u}{w}$$

$$Y = \frac{v}{w}$$

When thus calculating the projective transformation H as mentioned above, the deformation movement conversion data generating unit 14 stores, as the deformation movement conversion data (11) defining deformation and movement between the image projected by image projection device 1-1 and that captured by the image capturing device 4-1, the projective transformation H in the storage unit 13.

In this case, the deformation movement conversion data generating unit assumes that both the image 2-1 projected by the image projection device 1-1 and the image (11) captured by the image capturing device 4-1 are placed in a plane. As an alternative, by simply acquiring the corresponding points as a translation table, the deformation movement conversion data generating unit 14 can similarly obtain the deformation movement conversion data (11) defining deformation and movement between the image projected by image projection device 1-1 and that captured by the image capturing device 4-1 even if both the images are not placed in a plane.

The deformation movement conversion data generating unit can similarly acquire deformation movement conversion data (21), (22), and (32) defining deformations and movements between the images projected by the other image projection devices 1 and those captured by the other image capturing devices 4.

Next, the control unit 12 of the image geometric correction device 6 unifies the coordinate systems of the images captured by the image capturing devices 4-1 and 4-2 using the deformation movement conversion data generated by the deformation movement conversion data generating unit 14.

Concretely, the control unit unifies the coordinate systems of the images as follows.

First, in order to pinpoint a projection region E on the screen 3, as shown in FIG. 4, the control unit 12 allows the user to operate the indication unit 11 to input the vertexes A, B, C, and D of the projection region E, for example.

Among the vertexes A, B, C, and D of the projection region E, each of the vertex A which is the upper left one of them and vertex B which is the lower left one of them has coordinates in the coordinate system in the image region to be captured 5-1 of the image capturing device 4-1, each of the vertex C which is the upper right one of them and vertex D which is the lower right one of them has coordinates in the coordinate system in the image region to be captured 5-2 of the image capturing device 4-2.

Therefore, the control unit 12 unifies the coordinate systems in the projection region E by converting the coordinate system of the vertexes A and B into the coordinate system of the vertexes C and D, or converting the coordinate system of the vertexes C and D into the coordinate system of the vertexes A and B.

For example, when converting the coordinate system of the vertexes C and D into the coordinate system of the vertexes A and B, the control unit 12 searches for the image projection device 1-2 which is common to both the image capturing device 4-1 and the image capturing device 4-2 out of the image projection devices 1-1, 1-2, and 1-3.

The control unit 12 reads the deformation movement conversion data (22) defining deformation and movement between the image projected by the searched image projection device 1-2 and that captured by the image capturing device 4-2 from the deformation movement conversion data stored in the storage unit 13, and carries out inverse conversion of the deformation movement conversion data (22). In other words, because the deformation movement conversion data (22) is a 3×3 matrix (i.e., a projective transformation H), the control unit calculates the inverse matrix $H^{-1}$ of the projective transformation H.

When calculating the inverse matrix $H^{-1}$ of the projective transformation H, as mentioned above, the control unit 12 converts the coordinate system of the vertexes C and D into the coordinate system of the image projection device 1-2 by multiplying the coordinates of each of the vertexes C and D by the inverse matrix $H^{-1}$.

The control unit 12 then obtains the coordinate system of the image capturing device 4-1, i.e., the coordinate system of the vertexes A and B by multiplying the multiplication result by the projective transformation H which is the deformation movement conversion data (21).

As a result, the projection region E in the screen 3 is expressed by a quadrangle which connects the vertexes A, B, C, and D each of which is expressed as coordinates in the coordinate system of the image region to be captured 5-1 to one another.

In a case in which the process of unifying the coordinate systems of the image regions to be captured is not carried out, the vertexes A and C cannot be connected to each other and the vertexes B and D cannot be connected to each other because the coordinate system of the vertexes A and B differ from that of the vertexes C and D. Therefore, in order to determine the sides of the quadrangle, there is a necessity to carry out a process of determining the edges of the screen 3 or a process of compensating for distortions in the images captured by the image capturing devices 4-1 and 4-2 to form a single image.

Next, the control unit 12 sets up deformation movement positions of the image 2-1, 2-2, and 2-3 projected by the image projection devices 1-1, 1-2, and 1-3.

In other words, the deformation movement positions of the image 2-1, 2-2, and 2-3 projected by the image projection devices 1-1, 1-2, and 1-3 are set up so that they match with the projection region E in the screen 3.

Figure 5:
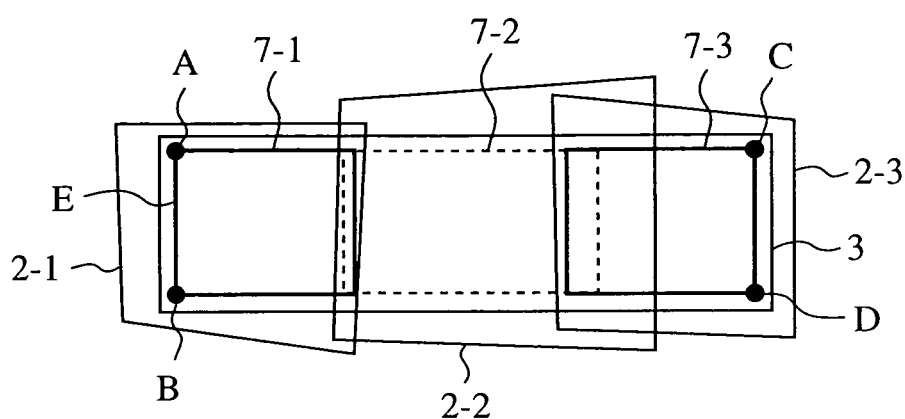
FIG. 5 is an explanatory diagram showing images which are deformed and moved.

In the example of FIG. 5, 7-1 denotes an image which is obtained by deforming and moving the image 2-1, 7-2 denotes an image which is obtained by deforming and moving the image 2-2, and 7-3 denotes an image which is obtained by deforming and moving the image 2-3.

The user can specify the deformation movement position of each projected image interactively by operating the indication unit 11. As an alternative, the projection position of each projected image on the screen 3 can be predetermined. In this example, the projection positions of the projected images which have been deformed and moved are set up so that the projected images overlap one another. As an alternative, the projection positions of the projected images which have been deformed and moved can be set up so that the projected images touch one another or are separate from one another.

Next, the control unit 12 converts the positions of the deformed and moved images 7-1, 7-2, and 7-3 which the image projection devices 1-1, 1-2, and 1-3 should project, respectively, into those in the coordinate systems of the image projection devices 1-1, 1-2, and 1-3, respectively.

For example, when converting the position of the deformed and moved image 7-1 into that in the coordinate system of the image projection device 1-1, the control unit 12 reads the deformation movement conversion data (11) from the storage unit 13, and carries out inverse conversion of the deformation movement conversion data (11). In other words, because the deformation movement conversion data (11) is a 3×3 matrix (or a projective transformation H), the control unit 12 calculates the inverse matrix $H^{-1}$ of the projective transformation H.

The control unit 12 converts the position of the deformed and moved image 7-1 into that in the coordinate system of the image projection device 1-1 by multiplying the position of the deformed and moved image 7-1 by the result of the inverse conversion of the deformation movement conversion data (11).

When converting the position of the deformed and moved image 7-2 into that in the coordinate system of the image projection device 1-2, the control unit 12 reads the deformation movement conversion data (21) from the storage unit 13, and carries out inverse conversion of the deformation movement conversion data (21). In other words, because the deformation movement conversion data (21) is a 3×3 matrix (or a projective transformation H), the control unit 12 calculates the inverse matrix $H^{-1}$ of the projective transformation H.

The control unit 12 converts the position of the deformed and moved image 7-2 into that in the coordinate system of the image projection device 1-2 by multiplying the position of the deformed and moved image 7-2 by the result of the inverse conversion of the deformation movement conversion data (21).

When also converting the position of the deformed and moved image 7-3 into that in the coordinate system of the image projection device 1-3, the control unit 12 reads the deformation movement conversion data (21) from the storage unit 13, and carries out inverse conversion of the deformation movement conversion data (21).

The control unit 12 converts the position of the deformed and moved image 7-3 into that in the coordinate system of the image projection device 1-2 by multiplying the position of the deformed and moved image 7-3 by the result of the inverse conversion of the deformation movement conversion data (21).

Next, the control unit 12 reads the deformation movement conversion data (22) from the storage unit 13, and converts the position of the deformed and moved image 7-3 into that in the coordinate system of the image capturing device 4-2 by multiplying the position of the deformed and moved image 7-3 in the coordinate system of the image projection device 1-2 by the deformation movement conversion data (22).

The control unit 12 then reads the deformation movement conversion data (32) from the storage unit 13, and carries out inverse conversion of the deformation movement conversion data (32).

The control unit 12 converts the position of the deformed and moved image 7-3 into that in the coordinate system of the image projection device 1-3 by multiplying the position of the deformed and moved image 7-3 in the coordinate system of the image capturing device 4-2 by the result of the inverse conversion of the deformation movement conversion data (32).

After the control unit 12 converts the positions of the deformed and moved images 7-1, 7-2, and 7-3 into those in the coordinate systems of the image projection device 1-1, 1-2, and 1-3, respectively, the projection state setting unit 15 of the image geometric correction device 6 calculates amounts of deformation and movement of the images 2-1, 2-2, and 2-3 so that the images 2-1, 2-2, and 2-3 projected by the image projection device 1-1, 1-2 and 1-3 match with the deformed and moved images 7-1, 7-2, and 7-3, respectively.

Figure 6:
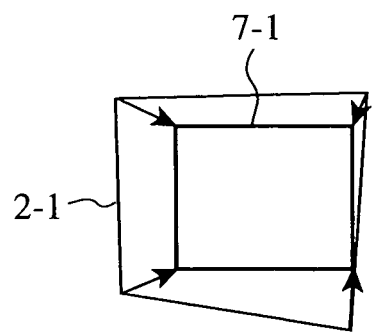
FIG. 6 is an explanatory diagram showing deformation and movement of an image.

FIG. 6 shows the deformation and movement of the image 2-1 projected by the image projection device 1-1 into the image 7-1, and → of FIG. 6 corresponds to the amount of deformation and movement of the image 2-1.

Because the amount of deformation and movement can be calculated using a known technique, the detailed explanation of the technique will be omitted hereafter. Because the position of the image 2-1 and the position of the deformed and moved image 7-1 are expressed in the same coordinate system, the amount of deformation and movement can be calculated for each set of the corresponding points of the images 2-1 and 7-1 by defining the relation between the corresponding points using a projective transformation H.

After the control unit calculates the amount of deformation and movement of each of the images 2-1, 2-2, and 2-3 as mentioned above, the projection state setting unit 15 of the image geometric correction device 6 outputs the amount of deformation and movement of the image 2-1 to the image projection device 1-1, and also outputs the amount of deformation and movement of the image 2-2 to the image projection device 1-2. The projection state setting unit further outputs the amount of deformation and movement of the image 2-3 to the image projection device 1-3.

When receiving the amount of deformation and movement of the corresponding one of the images 2-1, 2-2, and 2-3 from the projection state setting unit 15, the image deformation movement unit 21 of each of the image projection devices 1-1, 1-2, and 1-3 carries out the deformation processing and movement processing of the image which the image projecting unit 22 projects onto the screen according to the amount of deformation and movement.

The image projecting units 22 of the image projection devices 1-1, 1-2, and 1-3 project the images 2-1, 2-2, and 2-3 processed by the image deformation movement units 21, i.e., the images 7-1, 7-2, and 7-3 on the screen 3, respectively (see FIG. 5).

As can be seen from the above description, in accordance with this embodiment 1, the image geometric correction device 6 unifies the coordinate systems of the images captured by the image capturing devices 4-1 and 4-2 into a coordinate system, and carries out geometric correction of the images projected by the image projection devices 1-1, 1-2, and 1-3 on the basis of the image projection region E in the coordinate system into which the coordinate systems of the captured images are unified. Therefore, the present embodiment offers an advantage of being able to carry out geometric correction of the projected images without strictly placing the image capturing devices 4-1 and 4-2 at predetermined positions. Furthermore, because there is no problem with difference between the coordinate system of the image capturing device 4-1 and that of the image capturing device 4-2, the image projection system can process the images captured by the image capturing devices individually even if they capture the images from different capturing positions, and can also position the images without combining the images together as a single image.

In this embodiment 1, the three image projection devices 1-1, 1-2, 1-3, and the two image capturing devices 4-1 and 4-2 are disposed, as mentioned above. It cannot be overemphasized that the number of image projection devices and the number of image capturing devices can be arbitrarily selected.

Embodiment 2

In above-mentioned embodiment 1, the image projection devices 1-1, 1-2, 1-3 and the image capturing devices 4-1 and 4-2 are disposed, as mentioned above. In this embodiment, as shown in FIG. 7, image projection devices 1-4 and 1-5 and image capturing devices 4-3 and 4-4 are additionally disposed, and the indication unit 11 of the image geometric correction device 6 sets up a combination of the image projection device 1-3 and image capturing device 4-3, in addition to the following combinations.

A combination of the image projection device 1-4 and image capturing device 4-3

A combination of the image projection device 1-4 and image capturing device 4-4

A combination of the image projection device 1-5 and image capturing device 4-3

A combination of the image projection device 1-5 and image capturing device 4-4

In this case, the storage unit 13 of the image geometric correction device 6 stores images and deformation movement conversion data as shown in FIG. 8.

As a result, the present embodiment offers an advantage of being able to smoothly display overlapping portions of the images projected by the existing image projection devices 1-1, 1-2, and 1-3, and images projected by the newly-disposed image projection devices 1-4 and 1-5.

Embodiment 3

Figure 9:
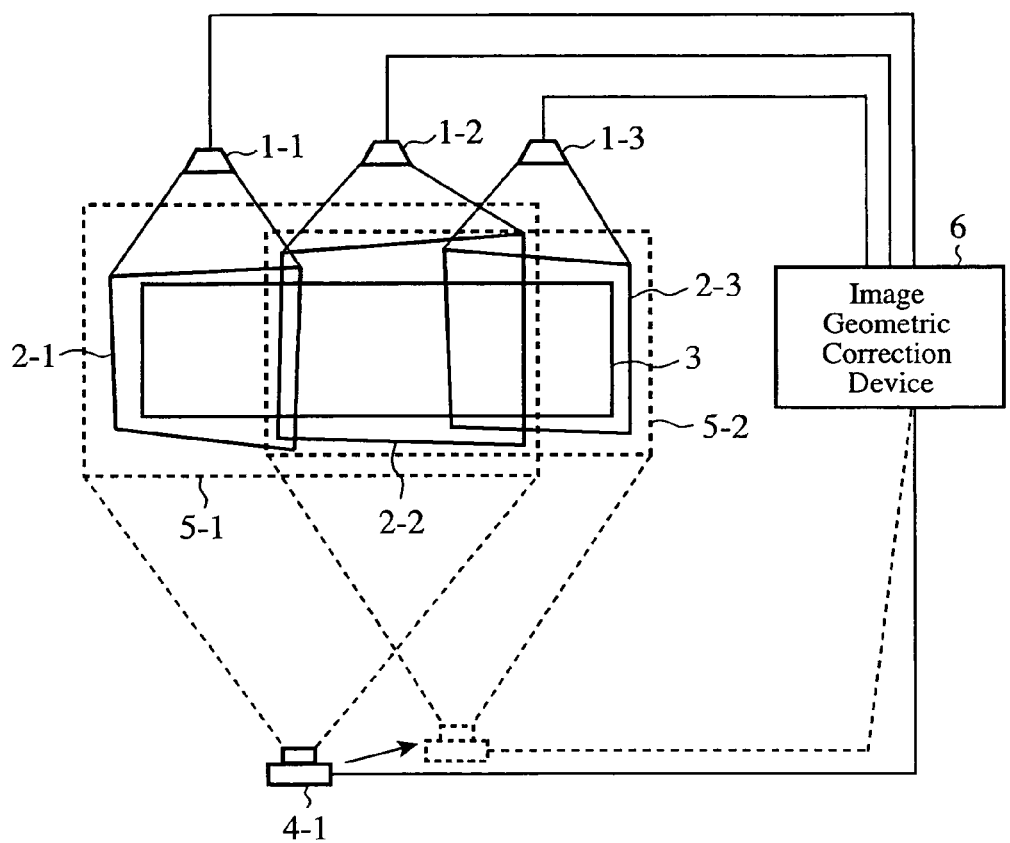
FIG. 9 is a block diagram showing an image projection system in accordance with embodiment 3 of the present invention.

In above-mentioned embodiment 1, an example in which the two image capturing devices 4-1 and 4-2 are disposed is shown. In a case in which the image capturing device 4-1 consists of a movable camera or the like, the image capturing device 4-1 is properly moved so that the image capturing device 4-1 can capture the image region to be captured 5-1 and image region to be captured 5-2, as shown in FIG. 9.

Even in this case, the same advantage as provided by above-mentioned embodiment 1 can be offered. Furthermore, this embodiment offers another advantage of being able to reduce the cost of constructing the image projection system by the image capturing device 4-2 which becomes unnecessary.

Embodiment 4

Figure 10:
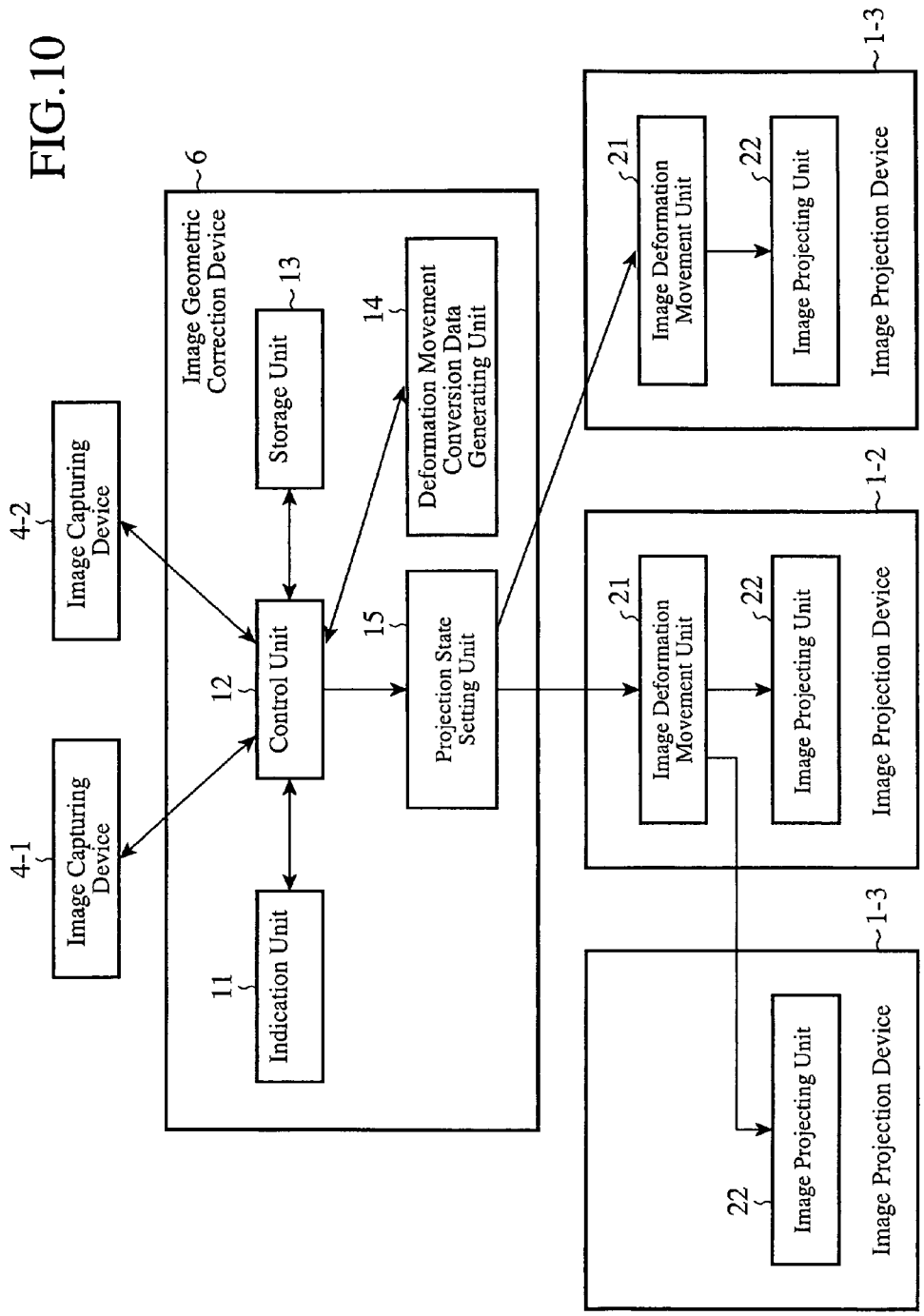
FIG. 10 is a block diagram showing the internal structure of each image projection device and the internal structure of an image geometric correction device in accordance with embodiment 4 of the present invention.

In above-mentioned embodiment 1, each of the above-mentioned image projection devices 1-1, 1-2, and 1-3 includes the image deformation movement unit 21 and image projecting unit 22, as previously explained. As an alternative, the image deformation movement unit 21 of the image projection device 1-2 can be so constructed as to serve as the image deformation movement unit 21 of the image projection device 1-1, as shown in FIG. 10.

Embodiment 5

In above-mentioned embodiment 1, the projection region of each of the image projection devices 1-1, 1-2, and 1-3 is so set as to extend in a horizontal direction of the screen, as previously explained. As an alternative, the projection region of each of the image projection devices can extend in an arbitrary direction of the screen, such as a vertical direction or a diagonal direction.

Figures 11, 12:
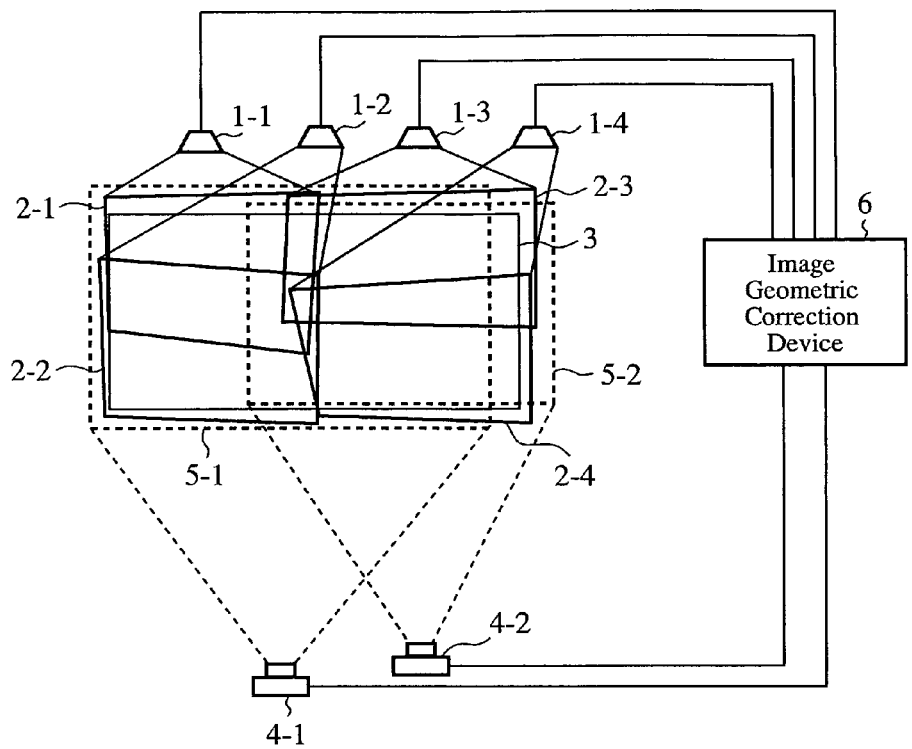
FIG. 11 is a block diagram showing an image projection system in accordance with embodiment 5 of the present invention.
FIG. 12 is an explanatory diagram showing images and deformation movement conversion data stored in a storage unit.

FIG. 11 shows an example in which the projection region of each of the image projection devices 1-1, 1-2, 1-3, and 1-4 extend in both the vertical direction and the horizontal direction of the screen.

In this case, images and deformation movement conversion data as shown in FIG. 12 are stored in the storage unit 13 of the image geometric correction device 6.

By unifying the coordinate systems of the images captured by the image capturing devices into one coordinate system, the positions and arrangement of the image projection devices can be freely changed.

INDUSTRIAL APPLICABILITY

As mentioned above, the image projection system in accordance with the present invention is suitable for cases in which there is a necessity to, when connecting part images projected by two or more image projection devices to one another on one screen so as to display a single image, make a geometric correction to each of the part images so that the part images projected by the two or more image projection devices can be smoothly connected to one another at their connection points, thereby producing a quite-normal large screen display.

The invention claimed is:

1. An image projection system comprising:
   two or more image projection devices each for projecting a part image of an image to be displayed on a screen on the screen;
   two or more image capturing devices each for capturing the image on the screen projected by each of said two or more mage projection devices; and
   an image geometric correction device for unifying coordinate systems of the images captured by said two or more image capturing devices, gathering a coordinate system conversion respectively determined for each connection between the images projected by the two or more image projection devices and the images captured by the two or more image capturing devices, and for making a geometric correction to the images projected by said two or more image projection devices on a basis of an image projection region in the coordinate system into which the coordinate systems of the captured images are unified, the image geometric correction device including an indication unit having a man machine interface that enables a user to specify a correspondence between the two or more image projection devices and the two or more image capturing devices.

2. The image projection system according to claim 1, wherein the image geometric correction device includes
   a coordinate system unifying unit for unifying the coordinate systems of the images captured by the two or more image capturing devices;
   a projection region setting unit for setting up the image projection region in the coordinate system into which the coordinate systems of the captured images are unified by said coordinate system unifying unit; and
   a geometric correction unit for making a geometric correction to the images projected by said two or more image projection devices so that projection regions of the image projected by said two or more image projection devices match with the image projection region set up by said projection region setting unit.

3. The image projection system according to claim 2, wherein the coordinate system unifying unit converts positions of the images captured by the two or more image capturing devices into those in a coordinate system of a reference image region.

4. The image projection system according to claim 2, wherein the geometric correction unit converts positions of the images projected by the two or more image projection devices into those in the image projection region set up by the projection region setting unit.

5. The image projection system according to claim 1, wherein the two or more image capturing devices are constructed of a movable camera.

6. An image geometric correction device comprising:
   a coordinate system unifying unit that unifies coordinate systems of images captured by two or more image capturing devices into a coordinate system gathering a coordinate system conversion respectively determined for each connection between images projected by two or more image projection devices and the images captured by the two or more image capturing devices;
   a projection region setting unit that sets an image projection region in the coordinate system into which the coordinate systems of the captured images are unified by said coordinate system unifying unit; and
   a geometric correction unit that geometrically corrects the images projected by said two or more image projection devices so that projection regions of the image projected by said two or more image projection devices match with the image projection region set up by said projection region setting unit, the image geometric correction device including an indication unit having a man machine interface that enables a user to specify a correspondence between the two or more image projection devices and the two or more image capturing devices.

7. The image geometric correction device according to claim 6, wherein the coordinate system unifying unit converts positions of the images captured by the two or more image capturing devices into those in a coordinate system of a reference image region.

8. The image geometric correction device according to claim 6, wherein the geometric correction unit converts positions of the images projected by the two or more image projection devices into those in the image projection region set up by the projection region setting unit.

\* \* \* \* \*